(12) United States Patent
McIver et al.

(10) Patent No.: US 8,926,252 B2
(45) Date of Patent: Jan. 6, 2015

(54) FRACTURE SAND SILO SYSTEM AND METHODS OF DEPLOYMENT AND RETRACTION OF SAME

(71) Applicant: Solaris Oilfield Site Services Operating LLC, Houston, TX (US)

(72) Inventors: Terry McIver, Santa Anna, TX (US); John Cunningham, Early, TX (US)

(73) Assignee: Solaris Oilfield Site Services Operating LLC, Houston, TX (US)

( * ) Notice: Subject to any disclaimer, the term of this patent is extended or adjusted under 35 U.S.C. 154(b) by 119 days.

(21) Appl. No.: 13/658,551

(22) Filed: Oct. 23, 2012

(65) Prior Publication Data

US 2013/0142601 A1    Jun. 6, 2013

Related U.S. Application Data

(60) Provisional application No. 61/550,776, filed on Oct. 24, 2011, provisional application No. 61/661,044, filed on Jun. 18, 2012.

(51) Int. Cl.
| | | |
|---|---|---|
| *B60P 1/64* | (2006.01) | |
| *B65G 65/40* | (2006.01) | |
| *B60P 3/00* | (2006.01) | |

(52) U.S. Cl.
CPC .............. *B65G 65/40* (2013.01); *B60P 1/6427* (2013.01); *B60P 3/00* (2013.01); *B60P 1/6418* (2013.01)
USPC .......................................... 414/332; 414/812

(58) Field of Classification Search
CPC ........ B60P 3/00; B60P 1/6427; B60P 1/6418; B65G 65/00

USPC ......... 414/288, 812, 332, 469, 546, 919, 482, 414/492, 334, 350, 22.54, 22.55
See application file for complete search history.

(56) References Cited

U.S. PATENT DOCUMENTS

| | | | |
|---|---|---|---|
| 2,606,676 A | * | 8/1952 | Dempster ..................... 414/469 |
| 2,808,164 A | | 10/1957 | Glendinning |
| 3,151,849 A | | 10/1964 | Maxon, Jr. |
| 3,160,289 A | | 12/1964 | Leefer |
| 3,208,616 A | * | 9/1965 | Haskins ....................... 414/332 |
| 3,313,435 A | | 4/1967 | Welk |
| 3,343,688 A | | 9/1967 | Ross |
| 3,415,498 A | | 12/1968 | Zaccaron |
| 3,448,866 A | | 6/1969 | Perry et al. |
| 3,547,291 A | | 12/1970 | Dempster |
| 3,618,801 A | | 11/1971 | Blanchard |
| 3,622,026 A | | 11/1971 | Tornheim |
| 3,666,129 A | | 5/1972 | Haskins |

(Continued)

FOREIGN PATENT DOCUMENTS

| | | |
|---|---|---|
| DE | 1274989 B | 8/1968 |
| DE | 3329412 A1 | 2/1985 |

(Continued)

*Primary Examiner* — Kaitlin Joerger
(74) *Attorney, Agent, or Firm* — Covington & Burling LLP

(57) ABSTRACT

The present invention is directed to novel transportable silo systems for storage of materials. The invention relates to self-erecting silo storage systems for use in the oil and natural gas mining and drilling industries. The silo storage systems of embodiments of the instant invention are uniquely designed to improve storage capabilities and mobility while at the same time reducing space requirements at well sites.

75 Claims, 17 Drawing Sheets

(56) References Cited

U.S. PATENT DOCUMENTS

| | | | |
|---|---|---|---|
| 3,687,319 A | 8/1972 | Adam et al. | |
| 3,848,758 A | 11/1974 | Carter | |
| 3,934,739 A | 1/1976 | Zumsteg et al. | |
| 3,985,254 A * | 10/1976 | Grandury | 414/498 |
| 4,111,314 A | 9/1978 | Nelson | |
| 4,163,626 A | 8/1979 | Batterton et al. | |
| 4,337,014 A | 6/1982 | Farnham | |
| 4,453,878 A | 6/1984 | Paukku | |
| 4,465,420 A | 8/1984 | Dillman | |
| 4,561,821 A | 12/1985 | Dillman | |
| 4,621,972 A * | 11/1986 | Grotte | 414/477 |
| 4,626,166 A * | 12/1986 | Jolly | 414/812 |
| 4,634,335 A | 1/1987 | van den Pol | |
| 4,708,569 A | 11/1987 | Nijenhuis | |
| 4,755,097 A | 7/1988 | Corompt | |
| 4,775,275 A | 10/1988 | Perry | |
| 4,810,159 A | 3/1989 | Stegmuller | |
| 4,855,960 A | 8/1989 | Janssen et al. | |
| 4,944,646 A | 7/1990 | Edwards et al. | |
| 4,963,070 A | 10/1990 | Detrick | |
| 4,986,719 A | 1/1991 | Galbreath | |
| 5,044,861 A * | 9/1991 | Kirchhoff et al. | 414/332 |
| 5,082,416 A | 1/1992 | Bock | |
| 5,102,284 A | 4/1992 | Raisio | |
| 5,108,247 A | 4/1992 | Vlaanderen | |
| 5,163,800 A | 11/1992 | Raisio | |
| 5,542,807 A | 8/1996 | Kruzick | |
| 6,474,926 B2 | 11/2002 | Weiss | |
| 6,869,261 B2 | 3/2005 | Burke | |
| 7,214,028 B2 * | 5/2007 | Boasso et al. | 414/812 |
| 7,278,816 B2 | 10/2007 | Marmur et al. | |
| 7,341,419 B1 | 3/2008 | Fink et al. | |
| 8,142,134 B2 * | 3/2012 | Lavoie et al. | 414/812 |
| 8,651,792 B2 * | 2/2014 | Friesen | 414/332 |
| 2003/0202869 A1 * | 10/2003 | Posch | 414/498 |
| 2005/0244256 A1 * | 11/2005 | Barry | 414/469 |
| 2005/0260062 A1 * | 11/2005 | Boasso et al. | 414/332 |
| 2007/0207017 A1 * | 9/2007 | Boasso et al. | 414/434 |
| 2010/0196130 A1 * | 8/2010 | Lavoie et al. | 414/469 |
| 2012/0024738 A1 * | 2/2012 | Herman et al. | 206/459.1 |
| 2013/0108402 A1 * | 5/2013 | Herman et al. | 414/332 |

FOREIGN PATENT DOCUMENTS

| | | | |
|---|---|---|---|
| DE | 4019618 A1 * | 1/1991 | B65D 88/08 |
| DE | 4108162 A1 | 9/1992 | |
| FR | 1370103 A | 8/1964 | |
| FR | 1486478 A | 6/1967 | |
| GB | 934113 A | 8/1963 | |
| JP | 57164825 A * | 10/1982 | B60P 1/64 |
| JP | 61181733 A * | 8/1986 | B60P 1/64 |

* cited by examiner

FRACTURE SAND SILO SYSTEM AND METHODS OF DEPLOYMENT AND RETRACTION OF SAME

The instant application claims priority under 35 U.S.C. §119(e) to U.S. Provisional Application 61/550,776 filed Oct. 24, 2011 and U.S. Provisional Application 61/661,044 filed Jun. 18, 2012, both of which are hereby incorporated by reference in their entireties.

FIELD OF THE INVENTION

The field of the invention relates to self-erecting silo storage systems for use in the oil and natural gas mining and drilling industries. The silo storage systems of embodiments of the instant invention are uniquely designed to improve storage capabilities and mobility while at the same time reducing space requirements at well sites.

BACKGROUND OF THE INVENTION

Oil and natural gas drilling and well sites are often located in remote areas that may be difficult to access. Usable storage space at well and drilling sites is also frequently very limited due to the terrain at the well sites or other factors related to the inaccessibility of the sites. As a result, storage space for materials necessary for drilling and mining operations is often at a premium. Improving the efficiency and use of storage space at drilling and well sites can have important economic as well as practical benefits for drilling and mining operations.

Mining companies sometimes make use of a technique termed "hydraulic fracturing" to aid in the extraction of fossil fuels from well sites. Hydraulic fracturing is the propagation of fractures in a rock layer caused by the presence of a pressurized fluid. Hydraulic fractures form naturally, as in the case of veins or dikes, and is one means by which gas and petroleum from source rocks may migrate to reservoir rocks.

In some cases, oil and gas companies may attempt to accelerate this process in order to release petroleum, natural gas, coal seam gas, or other substances for extraction, where the technique is often called "fracking" or "hydrofracking" This type of fracturing is done from a wellbore drilled into reservoir rock formations. The energy from the injection of a highly-pressurized fracking fluid creates new channels in the rock which can increase the extraction rates and ultimate recovery of fossil fuels. When done in already highly-permeable reservoirs such as sandstone-based wells, the technique is known as well stimulation. Operators typically try to maintain fracture width or slow its decline following treatment by introducing a proppant into the injected fluid. A proppant is a material, such as grains of sand, ceramic, or other particulates, that prevents the fractures from closing when the injection is stopped. Consideration of proppant strengths and prevention of proppant failure becomes more important at deeper depths where pressure and stresses on fractures are higher.

A distinction can be made between low-volume hydraulic fracturing which is used to stimulate high-permeability reservoirs and high-volume hydraulic fracturing. Low volume fracking operations may consume 20,000 to 80,000 gallons of fluid per well. High-volume hydraulic fracturing, which is used in the completion of tight gas and shale gas wells can use as much as two to three million gallons of fluid per well.

The large amount of water and proppant required in a fracking operation at a well site requires that these materials be stored close to the well site so that they may be used as needed. Typically, tractor trailer rigs are used to transport these materials to well sites. If no or insufficient storage space is available at the well site, it is oftentimes necessary to store the materials in the same tractor trailer rigs that delivered the materials to the well site. This is an inefficient and frequently cost-prohibitive solution to the storage problem because the trailers must be parked until needed. This is costly because the drivers and their trucks are forced to waste valuable time out of service. Thus, the efficient storage of materials at oil and natural gas well sites is a critical factor in the successful implementation of fracking operations—for practical and economic reasons.

The storage systems in embodiments of the instant invention are a novel and non-obvious solution to the storage problems described above.

SUMMARY OF THE INVENTION

The present invention is directed, in certain embodiments, to a storage system comprising: a trailer, the trailer including: a trailer bed; a flipper mechanism coupled to said trailer bed; a rocker arm coupled to said trailer bed and said flipper mechanism; a first hook plate and a second hook plate attached to said flipper mechanism, wherein said first hook plate and said second hook plate are laterally opposed to each other on said flipper mechanism and wherein said first hook plate and said second hook plate are oriented at a first non-zero angle with respect to each other; a storage bin, the storage bin including: a plurality of support legs; a first pin and a second pin attached to said plurality of support legs, said first pin coupleable to said first hook plate and said second pin coupleable to said second hook plate.

In certain embodiments, the storage system further comprises a third hook plate and a fourth hook plate attached to said flipper mechanism, wherein said third hook plate and said fourth hook plate are laterally opposed to each other on said flipper mechanism and wherein said third hook plate and said fourth hook plate are oriented at a second non-zero angle with respect to each other; and a third pin and a fourth pin attached to said plurality of support legs, said third pin coupleable to said third hook plate and said fourth pin coupleable to said fourth hook plate.

In certain embodiments, the storage system of the invention is such that said first non-zero angle and said second non-zero angle are equal to each other.

In certain embodiments, said first pin and said second pin are oriented at a third non-zero angle with respect to each other.

In certain embodiments, said third pin and said fourth pin are oriented at a fourth non-zero angle with respect to each other.

In certain embodiments, said first pin and said second pin are oriented at approximately 90 degrees with respect to one another.

In certain embodiments, said third pin and said fourth pin are oriented at approximately 90 degrees with respect to one another.

In certain embodiments, said third non-zero angle and said fourth non-zero angle are equal to each other.

In certain embodiments, said storage system further comprises a base platform. In certain embodiments, said base platform comprises tire guide rails. In certain embodiments, said base platform is configured to support three of said storage bins in a vertical position. In certain embodiments, said base platform is configured to support two of said storage bins in a vertical position. In certain embodiments, said base platform is configured to support one of said storage bins in a vertical position.

In certain embodiments of the invention, said trailer comprises independently operable hydraulic support legs. In other embodiments, said trailer comprises non-hydraulic support legs. In certain embodiments of the invention, said non-hydraulic support legs are positioned at a middle section of said trailer.

In certain embodiments of the invention, said flipper mechanism is rotatably coupled to said trailer. In certain embodiments of the invention, said flipper mechanism is coupled to the rear end of said trailer.

In certain embodiments of the invention, said flipper mechanism further comprises one or more pneumatic locking pins coupleable to said storage bin. In certain embodiments, said flipper mechanism further comprises one or more pneumatic locking pins coupleable to said support legs.

In certain preferred embodiments of the invention, said rocker arm is coupled to said flipper mechanism via a second arm. In certain embodiments, said rocker arm is coupled to an actuator. In certain embodiments, said actuator is a hydraulic cylinder or a hydraulic piston.

In certain embodiments, said rocker arm is curvilinear such that it forms a non-zero angle. In certain embodiments, lines drawn from each end of the rocker arm down a center axis of the rocker arm intersect with each other at a middle section of said rocker arm. In certain preferred embodiments, said non-zero angle is greater than 90 degrees. In certain preferred embodiments, said actuator is coupled to a middle section of said rocker arm.

In certain embodiments, said first and second hook plates do not comprise a latching mechanism. In certain embodiments, said third and fourth hook plates do not comprise a latching mechanism.

In other embodiments, said first and second hook plates comprise a latching mechanism. In other embodiments, said third and fourth hook plates comprise a latching mechanism.

In certain embodiments, the invention is directed to methods of raising a storage bin to a vertical position comprising: positioning a trailer onto the surface of a base platform; activating independent hydraulic jacks to elevate the rear end of said trailer; wherein said trailer includes: a flipper mechanism coupled to said trailer; a rocker arm coupled to said trailer and said flipper mechanism; a first hook plate and a second hook plate attached to said flipper mechanism, wherein said first hook plate and said second hook plate are laterally opposed to each other on said flipper mechanism and oriented at a non-zero angle with respect to each other; wherein said first hook plate and said second hook plate are coupled to pins attached to support legs on said storage bin; activating an actuator coupled to said rocker arm to raise said storage bin to a vertical position; releasing said hydraulic jacks to lower said rear end of said trailer to thereby disengage said storage bin from said hook plates and vertically position said storage bin on the surface of said base platform.

In certain embodiments, the invention is directed to methods of lowering a storage bin to a horizontal position on a trailer comprising: positioning a trailer onto the surface of a base platform; activating independent hydraulic jacks to elevate the rear end of said trailer to engage pins attached to support legs of the storage bin; wherein said trailer includes: a flipper mechanism coupled to said trailer; a rocker arm coupled to said trailer and said flipper mechanism; a first hook plate and a second hook plate attached to said flipper mechanism, wherein said first and second hook plate are laterally opposed to each other on said flipper mechanism and oriented at a non-zero angle with respect to each other; activating an actuator coupled to said rocker arm to lower said storage bin to a horizontal position; releasing said hydraulic jacks to lower said rear end of said trailer.

In certain embodiments, the invention is directed to a trailer comprising: a trailer bed; a flipper mechanism rotatably coupled to said trailer bed; a rocker arm coupled to said trailer bed and said flipper mechanism; a first hook plate and a second hook plate attached to said flipper mechanism, wherein said first hook plate and said second hook plate are laterally opposed to each other on said flipper mechanism and wherein said first hook plate and said second hook plate are oriented at a first non-zero angle with respect to each other; an actuator coupled to said rocker arm.

In certain embodiments, the invention is directed to a trailer wherein said first hook plate and said second hook plate are respectively coupleable to a first pin and a second pin of a storage bin, wherein the first pin and the second pin are oriented at a non-zero angle with respect to each other.

BRIEF DESCRIPTION OF THE FIGURES

Appended FIGS. 1-16 depict certain non-limiting embodiments of the fracture sand silo system and related systems. The figures are not intended to limit the scope of the invention but, instead, are intended to provide depictions of specific embodiments, features and non-limiting characteristics of the systems described herein. More specifically, the Figures depict certain non-limiting embodiments of the invention as follows:

FIG. 1 depicts a silo system in a horizontal orientation on a trailer bed located on a base platform.

FIG. 2 depicts a silo system being raised from or lowered onto a trailer bed.

FIG. 3 depicts a silo system in an upright vertical orientation.

FIG. 5 depicts a pin attached to a support leg.

FIG. 6 depicts a flipper mechanism.

FIG. 7 depicts a flipper mechanism in an upright orientation attached to a trailer bed.

FIG. 8 depicts the base of a silo with four support legs and pins attached to the four support legs.

FIG. 9 depicts the lower portion of a flipper mechanism with a pin engaged with a hook plate.

FIG. 10 depicts a free-standing silo disengaged from a flipper mechanism and trailer bed. The flipper mechanism is fully retracted and in a horizontal orientation.

FIG. 11 depicts an upright flipper mechanism on a trailer bed which is resting on a base platform.

FIG. 12 depicts the unique interaction between the pins attached to the silo legs and the corresponding hook plates attached to or part of the flipper mechanism. The figure also depicts manual latching mechanisms engaged with pins.

FIG. 13 depicts a manual latching mechanism engaged with a pin that is seated in a hook plate.

FIG. 14 depicts a side view of three silos positioned in the vertical orientation on a base platform.

FIG. 15 depicts a side view of two silos positioned side-by-side on two different base platforms. In between the two silos is a dual belt conveyor system.

FIG. 16 depicts an arrangement of six silos, in the "six pack" configuration, positioned vertically on two separate base platforms. In between the two rows of three silos is a dual belt conveyor system.

DETAILED DESCRIPTION OF THE INVENTION

Figure 1:
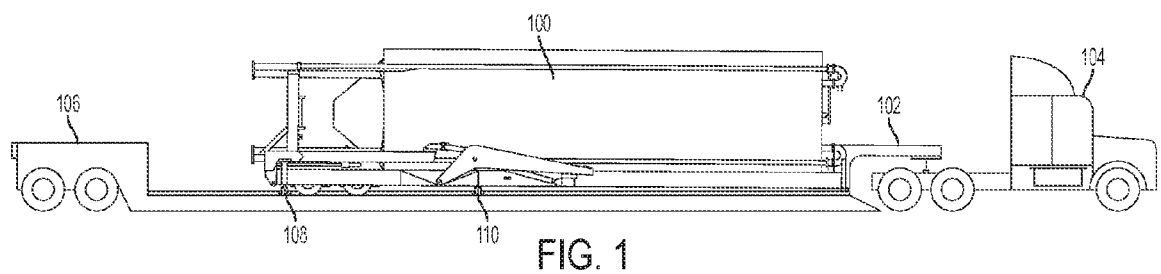

The self-erecting silo systems of embodiments of the instant invention have many unique features and novel characteristics that distinguish them over prior systems. They also have many improved benefits over prior systems, some of these benefits are summarized below. As used in the present application "coupling" between two components, or when two components are "coupled," means that the two components are linked together, which could include linkage via an intervening component or element. As used herein, components or elements that are discussed separately could be part of the same component or element.

Silos

The silos of embodiments of the invention may be used to store any material, including, but not limited to water, sand, proppant or an acid solution. In certain embodiments, the silo 100, may be used to store an approximately 16-40% acid solution, or an approximately 20-50% acid solution, or an approximately 25-45% acid solution, or an approximately 30-40% acid solution, or an approximately 35% acid solution. In certain embodiments, the acid may be hydrochloric acid (HCl). In certain preferred embodiments, silo 100 may be used to store an approximately 16-40% HCl solution, or an approximately 20-50% HCl solution, or an approximately 25-45% HCl solution, or an approximately 30-40% HCl solution, or an approximately 37-40% HCl solution, or an approximately 35% HCl solution. In certain embodiments, the silos of embodiments of the invention may be configured for or usable in fracking applications.

The silos in certain embodiments may be coated on the inside with one or more salt-resistant coatings. In certain other embodiments, the silos may be coated on the inside with one or more acid-resistant coatings.

In certain embodiments, the silos may contain one or more devices for monitoring the level of the contents. The monitoring devices may be sonic, radar, optical, inductive or mechanical level monitors. In certain embodiments, load cells or strain gauges attached to the silo legs may be used to weigh the contents of the silo. Measuring the contents is useful for inventory management, determining and controlling the rate of usage, and avoiding over filling or unexpected empty conditions.

Base Unit

The base unit of the self-erecting silo system allows for a rigid stable base for installation, operation and removal of sand silos. The flat bottom unit, which may support one or more silos, allows larger weight-bearing area on the ground resulting in lower ground pressure per unit weight of system compared to comparable systems that do not include a flat bottom unit. The generator system allows self-contained operation of the entire system. The air boost system reduces the time required for sand silo filling. Within the air boost system, a blower with variable speed drive allows a constant pressure air delivery to multiple fill tubes. Fill tubes are tubes that are used to fill the silos of the invention with a proppant such as, for example, sand. In certain embodiments of the invention, from one to four fill tubes may be attached to a silo of the invention. A blower pipe incorporated into the base unit allows for quick connection to fill silo units with auxiliary port to charge a second base unit. A power distribution center is included for distribution of power to the one to three silos positioned on a base platform with preinstalled hardware to operate a second base platform. A control power transformer is included for integrated manual control system. The base may be transported as though it were a trailer by attaching it to a tractor.

Silo Trailer

The silo trailer includes hydraulic jacks at the rear of trailer which allows for carrying out the following functionalities: (a) raising of the trailer to allow silo clearance during raising of the silo; (b) leveling and stabilizing the trailer on the base unit to allow raising and lowering of the silo from a stable platform; (c) the silo, once raised, is lowered onto the platform by lowering the hydraulic jacks; (d) continued lowering of the jacks disengages the trailer from the silo; and (e) once the trailer is positioned, the hydraulic jacks are engaged to raise the silo rear thereby engaging the silo for lowering and tow away.

Erecting mechanism compound linkage. The erecting mechanism allows the use of single stage hydraulic cylinders (that contain one barrel and one piston) for ease of manufacture and maintenance. The erecting mechanism also allows for rotation of the silo during raising to pass through 90 degrees to allow for site variations.

Silo attachment. Hook plates are perpendicular assuring proper silo alignment when the trailer is backed into position. Pneumatic latch pins (or the latching mechanism depicted in FIGS. 4B, 12 and 13) engage to hold the silo attachment pins in the silo hook plate for raising, lowering, and transportation. This is done from ground level, without auxiliary equipment. Trailer operation controls are performed remotely via wireless control panel with a hardwired pendant controller as a back-up.

Sand Silo

Shuttle conveyor. Conveyors move material, such as sand or other solid or semi-solid material used in fracking applications, horizontally. This allows a lower overall installed height than using conventional inclined chutes. Variable frequency drives are installed to allow control of material feed rate. The shuttle conveyor is reversible to allow discharging material from either side of the silo. In certain embodiments, the shuttle conveyor may be controlled by an electric drive system that repositions the conveyor in any direction. The conveyors transport in position on the silo. The conveyor is mounted on rollers to allow multiple placement options. In certain embodiments, this allows the customer to reposition to feed a second conveyor if necessary. In certain embodiments, this also allows the conveyor to be repositioned to drain the silo independently. In still further embodiments, this also allows the conveyor to be removed and replaced quickly for purposes of maintenance and repair. In certain embodiments, multiple fill lines allow simultaneous loading from various locations. In a preferred embodiment, the shuttle conveyor is reversible to allow discharging of material to either side of the silo. The speed of the conveyor is remotely controlled via a digital electronic system, providing precise control of the discharge rate to match the required flow of the fracking operation.

System

The self-erecting silo systems of embodiments of the instant invention are highly mobile, with a modularized construction. The self-erecting silo system allows for ground level installation, operation and disassembly without additional equipment such as lifts, cranes or ladders. The self-erecting silo system allows approximately three times the onsite usable sand storage within the same foot print as existing systems. The systems of embodiments of the instant invention are designed to operate in multiple configurations based on customer requirements. The systems embodiments of the instant invention also comprise manual control panels to operate the entire system from a single location.

In certain embodiments of the invention, the dual belt conveyor and the shuttle conveyors both have Variable Frequency Drives (VFD). In certain embodiments, the end of the dual belt conveyor that drops proppant into a container, such as a hopper or a blender hopper, will have a device (such as, for example, a pulsed radar device) that will constantly monitor the level of sand (or other proppant) in the container, hopper or blender hopper. In certain embodiments, the pulsed radar device will communicate to the VFD's on the shuttle and dual belt conveyors in order to increase or slow their speeds so that the level of proppant in the container, hopper or blender hopper may be adjusted and controlled. This system can be wireless or Ethernet cable connected. In preferred embodiments, the systems of the invention are designed to maintain a constant level and supply of sand, or other proppant (which is adjustable) from the one or more silos to the container, hopper or blender hopper that feeds the fracking operation ("the frac job). In preferred embodiments of the invention, the system will also be able to monitor the level of sand in each silo. In certain preferred embodiments, this monitoring is accomplished using, for example, pulsed radar monitors positioned inside of the silos of the invention at the top portion of the silo. In certain preferred embodiments, a daylight visible LED sign on the base unit will display how much sand is in each silo. The pulsed radar on the top of the silo is used to detect the sand profile in the silo, as it takes the angle of repose of the sand into consideration and produces an effective level in the silo. In certain preferred embodiments, the systems of the invention are designed to determine the level of proppant in the silo in real time. In preferred embodiments, the system will detect the amount of proppant in the silo in units of mass, such as pounds or kilograms. In preferred embodiments, since the system is designed to monitor proppant amounts in real time, the system can furnish the rate at which the sand or other proppant is being removed from the silo, as well as the rate of sand delivery going into the blender hopper originating from the one or more silos. In order to maintain an efficient frac job, it is necessary to control the rate of sand or other proppant that is being pumped into the well. In certain embodiments, the rate at which proppant or other material is released from any of the silos of the invention is regulatable. In certain embodiments, said regulatable flow of material or proppant from each silo of the invention is controlled using detectors and automated.

In certain preferred embodiments, the flow of proppant from the silos of the invention to the storage bin, container, hopper or blender hopper is automatically regulated and controlled by a pre-set program or a program determined by conditions at the frac job.

Erection assembly. In one embodiment, the self-erecting silo system includes an erection assembly comprising a hydraulic jack and a rocker arm. In one embodiment the rocker arm has a distal end and a proximal end. In this embodiment, the proximal end is movably or rotatably attached to the trailer, while the distal end is attached or coupled to a flipper mechanism that is adapted to be docked to a silo. The hydraulic jack, which may also be attached or coupled to the trailer, may have an actuating arm that is attached or coupled to a middle section of the rocker arm that is located between the distal and proximal ends. Locating the attachment or coupling point of the actuating arm at the middle section of the rocker arm may beneficially allow the use of a hydraulic jack and/or actuating arm that is smaller than a hydraulic jack and/or actuating arm attached directly the flipper mechanism (or one that is of a standard size that is readily available). Further, such a configuration may lead to a smaller range of motion of the hydraulic jack in the tangential direction as the hydraulic jack is operated to move the actuating arm through its full range of motion (with the actuating arm attached or coupled to the rocker arm or the flipper mechanism). In an aspect of this embodiment, the distal end and the proximal end may be at a non-zero angle with respect to one another. In this aspect, the trailer section at which the proximal end is attached or coupled to the trailer may be formed to fully support a surface of the proximal end when the hydraulic jack is in an equilibrium position, such as when a silo has been placed in the fully erect position, or when a silo has been placed in the fully reclining position on the trailer. In this aspect, proper support of the rocker arm in the position of equilibria may lead to lower stresses upon the rocker arm and lead to a more resilient assembly.

In a related embodiment, the self-erecting silo system may include a plurality of erection assemblies as described above. For example, in an aspect of this related embodiment, the self-erecting silo system may include two erection assemblies, for example, located on opposing sides of the trailer.

Silo—flipper mechanism interface. The flipper mechanism in certain embodiments is the part of the self-erecting silo system that is configured to be attached or coupled to a silo or a hook plate that is attached to a silo. In one embodiment, the flipper mechanism includes hooks adopted for coupling to projecting pins of the silo or the hook plate of the silo. The openings of the hooks allow a trailer to be easily backed onto an erect silo, given the play allowed by the openings of the hooks. In this way, backing the trailer onto the erect silo may not need to be done with great precision, given that the pins of the silo or the hook plate of the silo (or, in another embodiment, the pins of the silo and the hook plates of the flipper mechanism) need not be threaded through one or more holes on the flipper mechanism in coupling the silo to the self-erecting silo system.

In one aspect of this embodiment, the pins of the silo or hook plates of the silo may not all be parallel; for example, two or four of these pins may be oriented at a non-zero angle with respect to one another. In this aspect, correspondingly, the corresponding hooks of the flipper mechanism will also be oriented at a non-zero angle with respect to one another so that the two or four pins may operably couple to their corresponding hooks. Angling the pins with respect to one another (and, correspondingly, angling the hooks with respect to one another) may reduce or eliminate undesired lateral motion of the silo and/or the hook plate of the silo with respect to the self-erecting silo system when the silo is coupled to the self-erecting silo system.

In a variation of the above embodiment, the projecting pins may be located on the flipper mechanism, whereas the corresponding hooks for receiving the pins may be located on the silo or on the hook plate of the silo.

In the embodiment depicted in FIG. 1, the silo 100 may be mounted on a trailer 102 and transported using a truck 104 to a site where the silo is to be employed. Upon arrival at the site, the truck 104 may be used to position the trailer 102 onto the surface of a base platform 106 that has been prepositioned at the site. In a preferred embodiment, from one to three vertical free-standing silos may be positioned on a single base platform 106. In another preferred embodiment, two vertical free standing silos may be positioned on a single base platform 106. In another preferred embodiment, three vertical free standing silos may be positioned on a single base platform 106. The base platform 106 serves to stabilize the silo 100 and the trailer 102 as the silo 100 is deployed to a vertical position. The base platform 106 also functions to provide stability to the silo 100 once it is in the vertical position. The base platform 106 additionally acts to enhance stability when the silo 100 is retracted back onto the trailer 102 after deployment.

Figure 2:
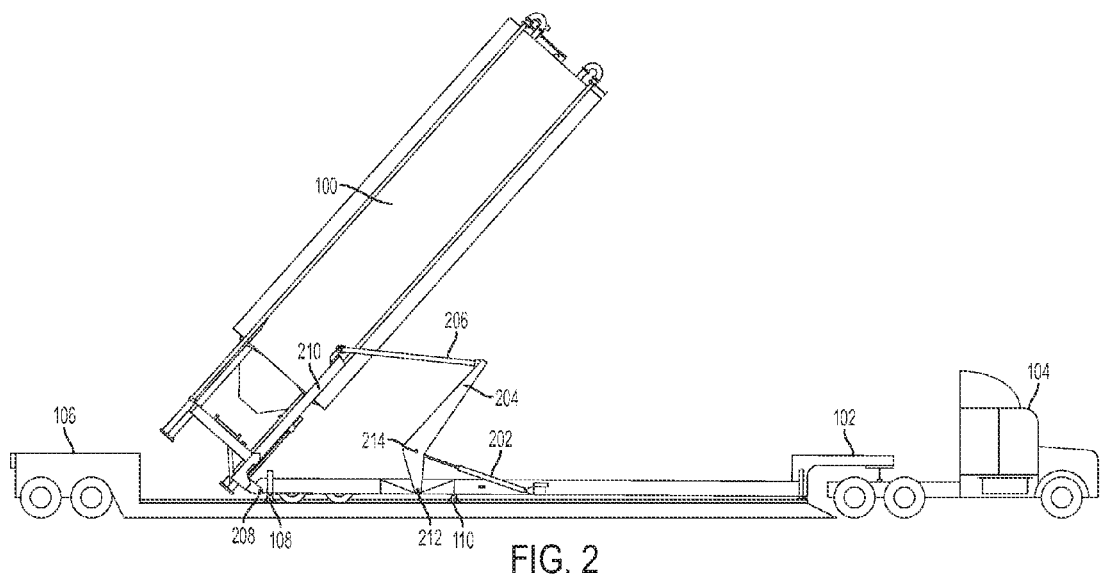

FIG. 2 depicts, in an embodiment, an actuator 202 (which in certain embodiments may be a hydraulic cylinder or rod) that is coupled to the trailer 102 and a rocker arm 204. The rocker arm 204 is coupled to the trailer 102 at a pin 212 which serves as a pivot point for the rocker arm 204 about which the rocker arm 204 can rotate. The rocker arm 204 is also coupled to an arm 206. Arm 206 is coupled to the flipper mechanism 210 which is in turn coupled to the silo 100. The flipper mechanism 210 is also coupled to the trailer 102 at pin 208. Pin 208 serves as a pivot point for the flipper mechanism 210 about which the flipper mechanism 210 can rotate. The silo 100 may be raised to a vertical position (or lowered to a horizontal position) by activating the actuator 202 such that the rocker arm 204 and arm 206 rotate the flipper mechanism 210 from a horizontal to a vertical position (or conversely from a vertical to a horizontal position.) The base platform 106 provides stability to the silo 100 as well as the trailer 102 during and after deployment or retraction of the silo 100.

Figure 3:
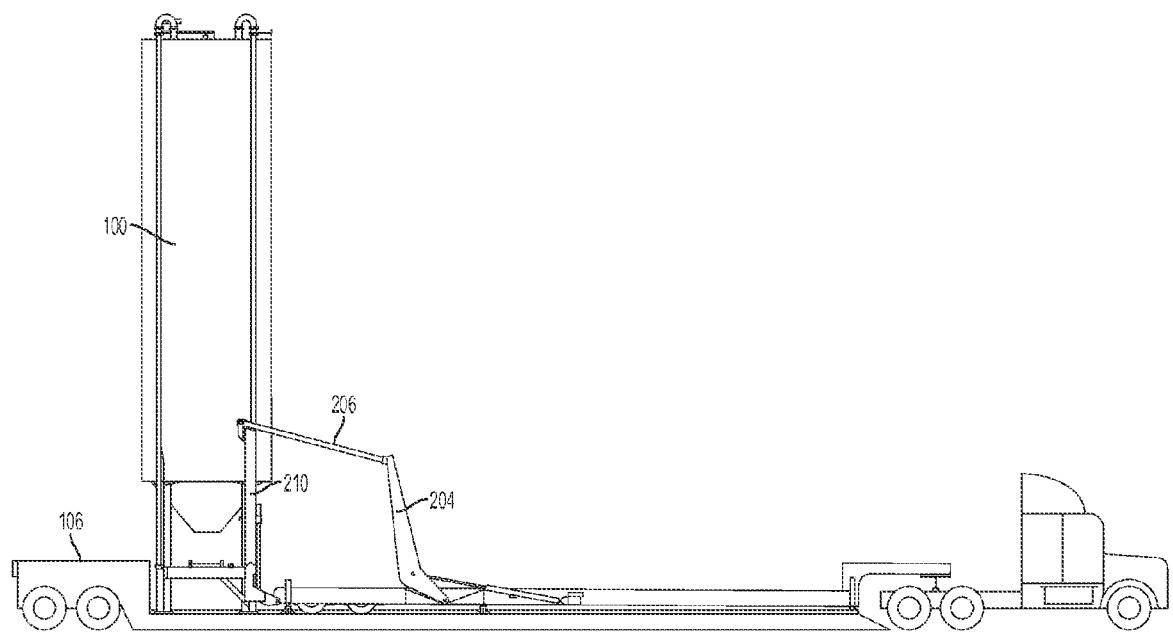

FIG. 3 depicts the silo 100 in a fully vertical position but still coupled to the flipper mechanism 210 which is in turn coupled to arm 206 and the rocker arm 204.

Figure 4A:
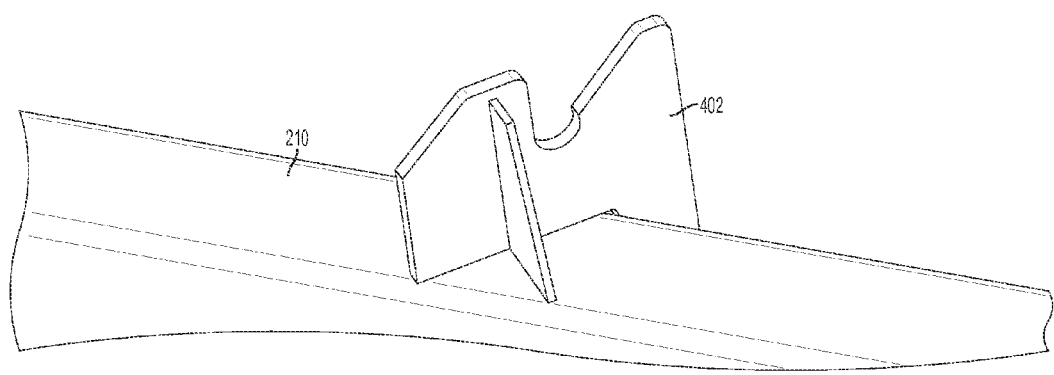
FIG. 4A depicts a hook plate.

FIG. 4A depicts a hook plate 402 that is attached to or is part of the flipper mechanism 210 in an embodiment of the silo system.

Figure 4B:
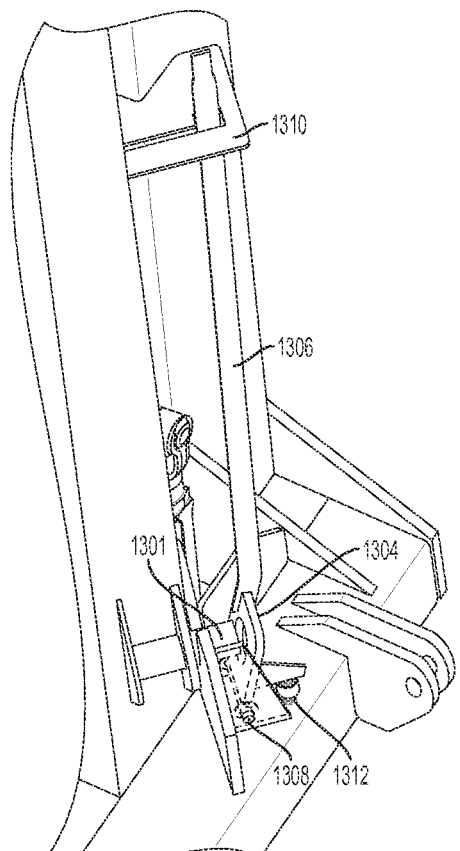
FIG. 4B depicts a hook plate, pin and manual latching mechanism.

FIG. 4B depicts a pin 1301 and a latching mechanism comprising a hinged plate 1304 with a hole which is so located such that the hole in the plate may receive the end of pin 1301. In one embodiment, the latching mechanism comprises a spring 1312, a hinge 1308, a lever handle 1306 and a plate 1310 to secure the lever 1306.

Figure 5:
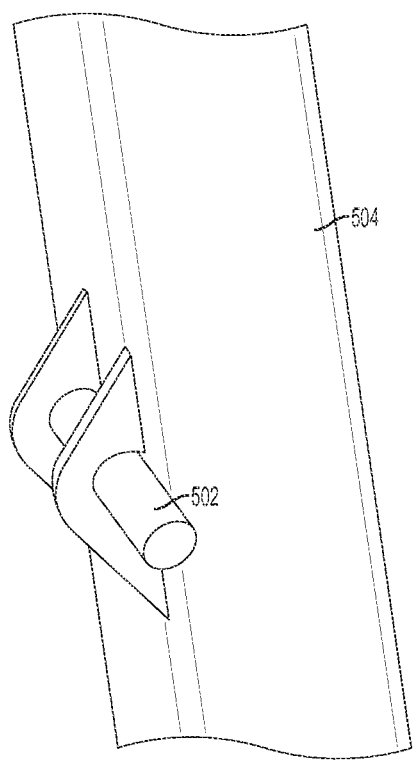

FIG. 5 depicts, in an embodiment, a pin 502 that is attached to a silo leg 504 that may, in embodiments of the invention, be received by hook plate 402.

Figure 6:
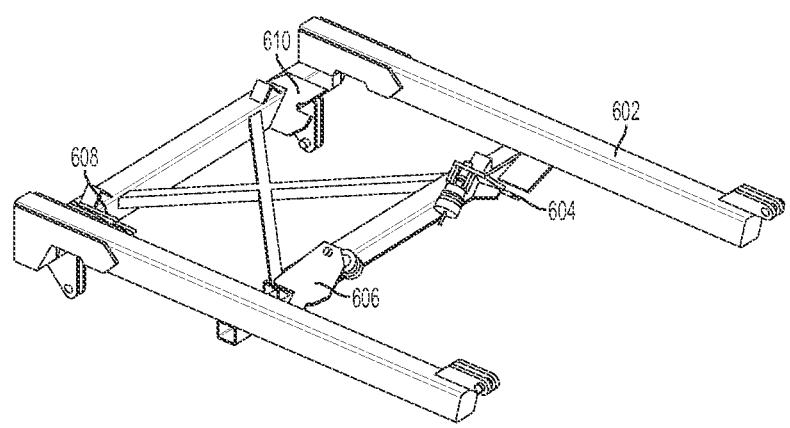

FIG. 6 depicts an embodiment of a flipper mechanism that includes hook plates 604, 606, 608 and 610 attached to or part of the flipper mechanism 602. In this embodiment, each of these hook plates is configured to receive a corresponding pin attached to the legs of the silo. Reception of each pin that is part of or attached to the leg of the silo by a corresponding hook plate assists in securing a silo to the flipper mechanism, as is described in greater detail below.

Figure 7:
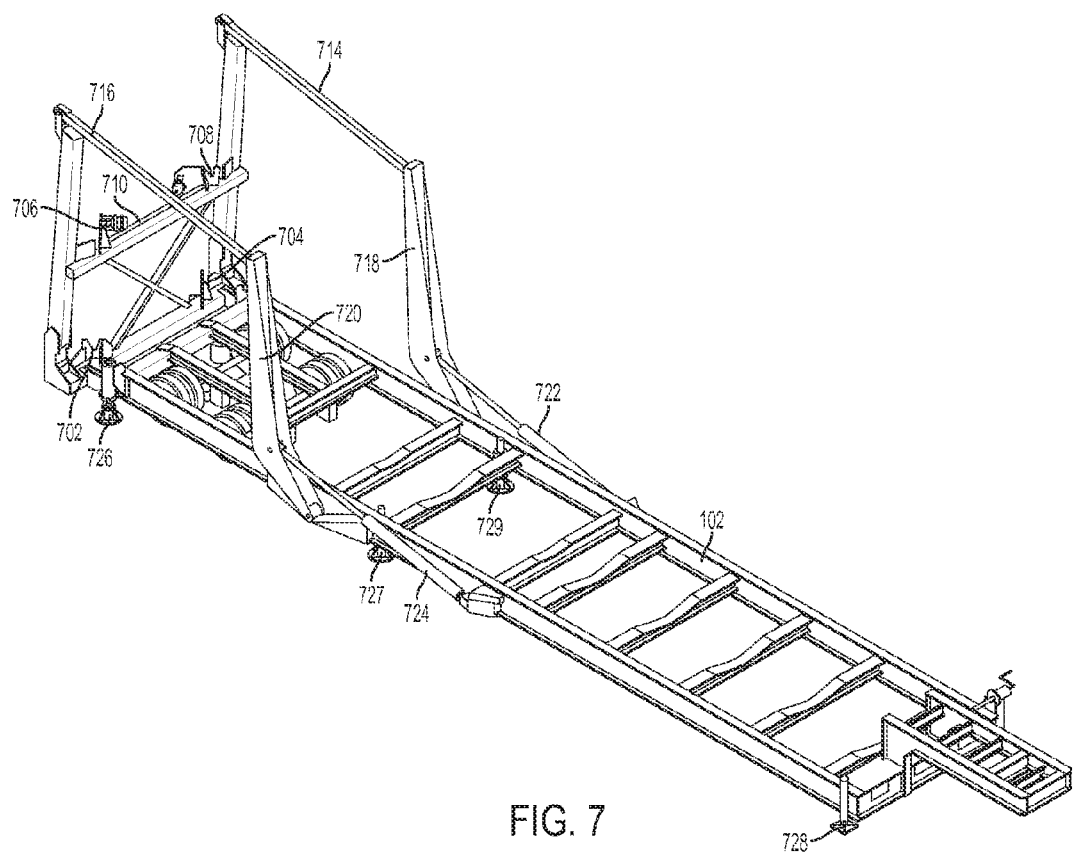

FIG. 7 depicts hook plates 702, 704, 706 and 708 on flipper mechanism 710 in an embodiment. In this embodiment, the flipper mechanism 710 is coupled to trailer 102 through a pin 208 which is not depicted in FIG. 7 (but is depicted in FIG. 2 as 208) and a corresponding pin on the other side of trailer 102 that is also not depicted in FIG. 7); arms 714 and 716; rocker arms 718 and 720; and actuators 722 and 724. Also depicted is hydraulic jack 726 and support feet 727, 728 and 729.

Figure 8:
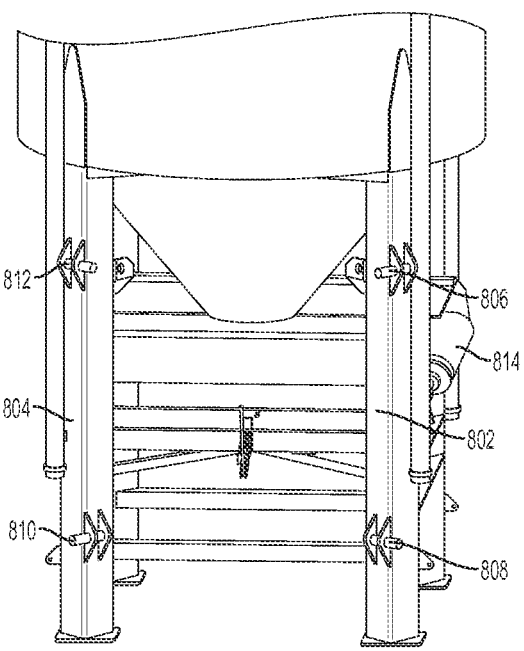

In the embodiment depicted in FIG. 8, pins 806 and 808 are attached to different faces of silo leg 802. Similarly pins 810 and 812 are attached to different faces of silo leg 804, so that pin 812 and pin 808 are substantially parallel to one another, while pin 806 and pin 810 are substantially parallel to one another. Moreover, each of pins 812 and 808 are oriented at a non-zero angle with respect to each of pin 806 and pin 810. Pins 806 and 812 are laterally opposed to each other. Pins 808 and 810 are laterally opposed to each other. Angling the pins with respect to one another (and, correspondingly angling corresponding hook plates of the flipper mechanism with respect to one another as depicted in FIG. 6) reduces or eliminates undesired lateral motion of the silo and/or the hook plates of the flipper mechanism with respect to the self-erecting silo system when the silo is coupled to the flipper mechanism. Further, this novel and non-obvious orientation of the four pins 806, 808, 810 and 812 allows for self-alignment of the pins with the corresponding hook plates attached to or part of the flipper mechanism. Also depicted is conveyor belt 814 which is used to transport material that is stored in silo 100 once it is erected.

Figure 9:
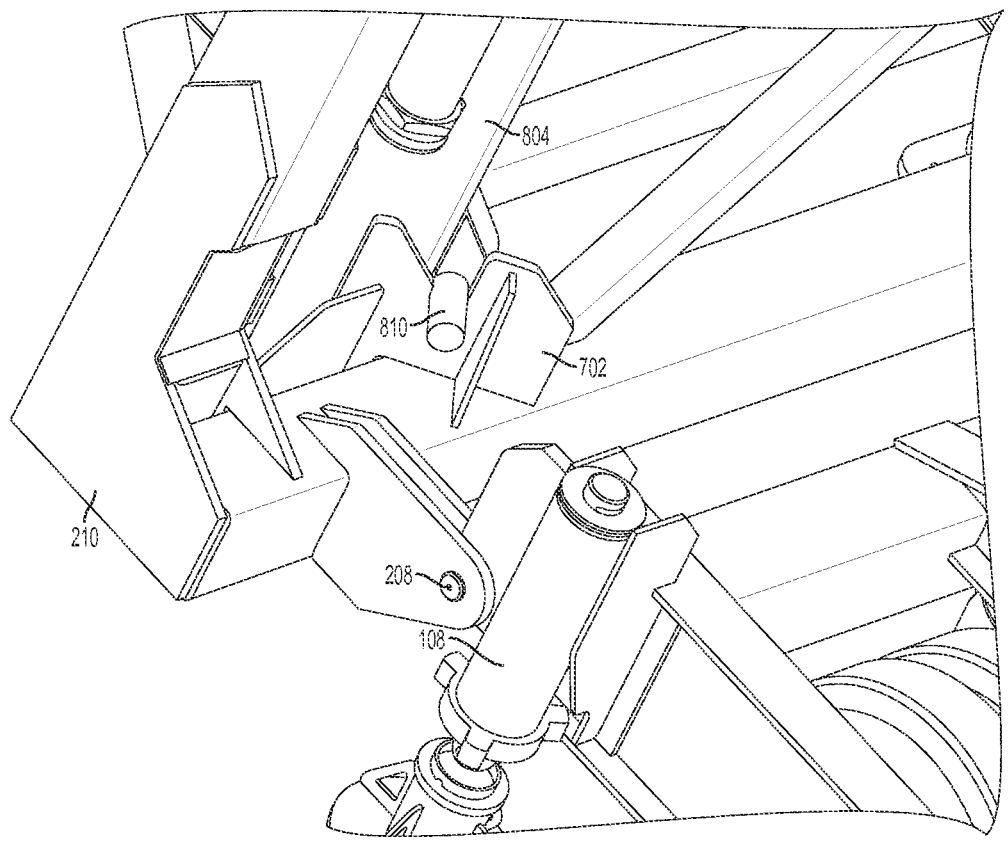

FIG. 9 depicts the engagement of hook plate 702 with pin 810, in an embodiment. The hook plate 702 is attached to or part of the flipper mechanism 210 and the pin 810 is attached to the silo leg 804. Also depicted is pin 208 (also depicted in FIG. 2) which serves as a swivel point about which the flipper mechanism 210 rotates.

Figure 10:
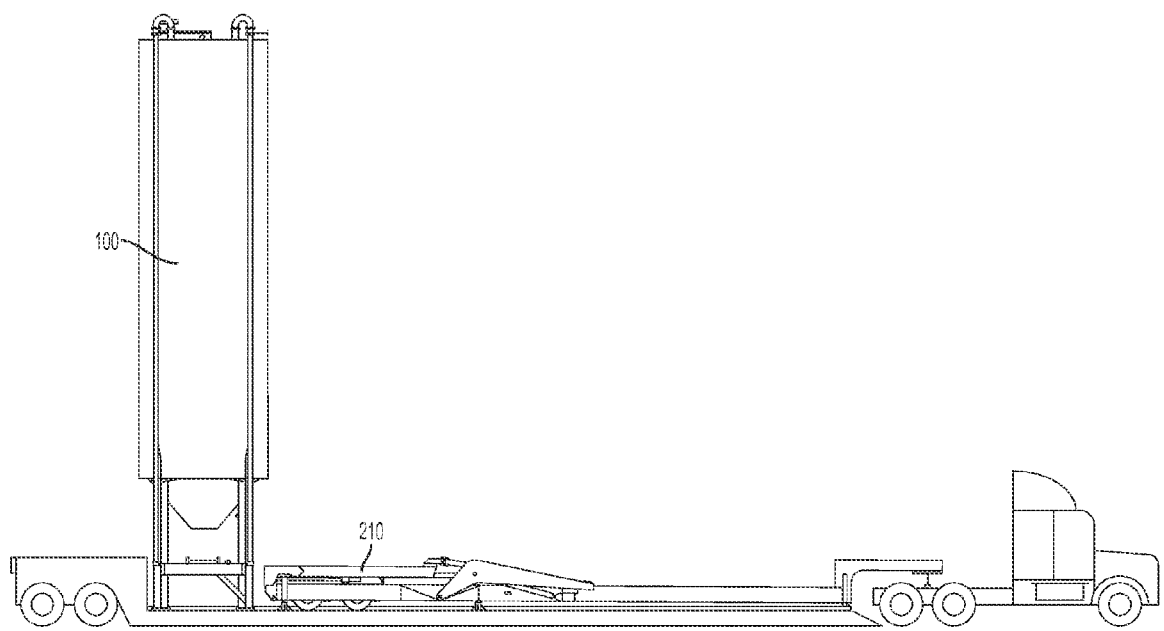

FIG. 10 depicts a configuration in which the silo 100 is free standing and disengaged from the flipper mechanism 210. The flipper mechanism 210 has been fully retracted.

Figure 11:
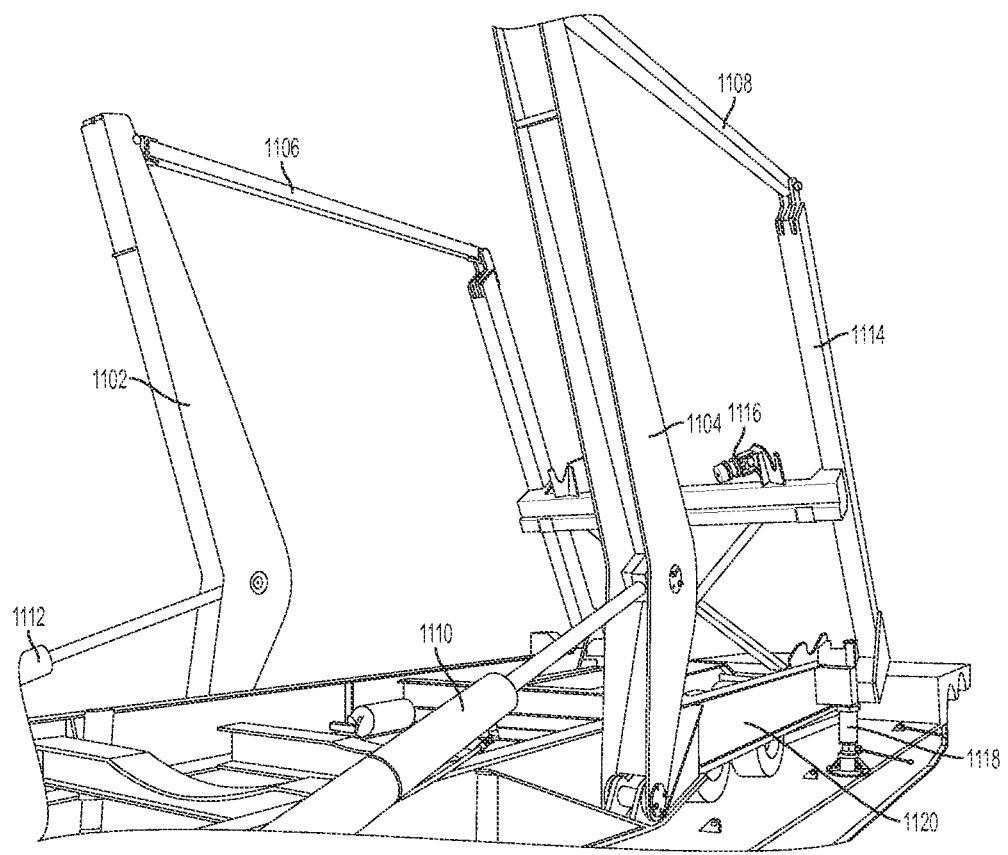

FIG. 11 depicts two actuator—rocker arm—arm assemblies, with each placed on one side of trailer 1120. In FIG. 11, rocker arms 1102 and 1104 are coupled to arms 1106 and 1108, respectively. Actuators 1110 and 1112 are coupled to rocker arms 1104 and 1102, respectively. Also depicted is flipper mechanism 1114, pneumatic pin 1116, and hydraulic jack 1118.

Figure 12:
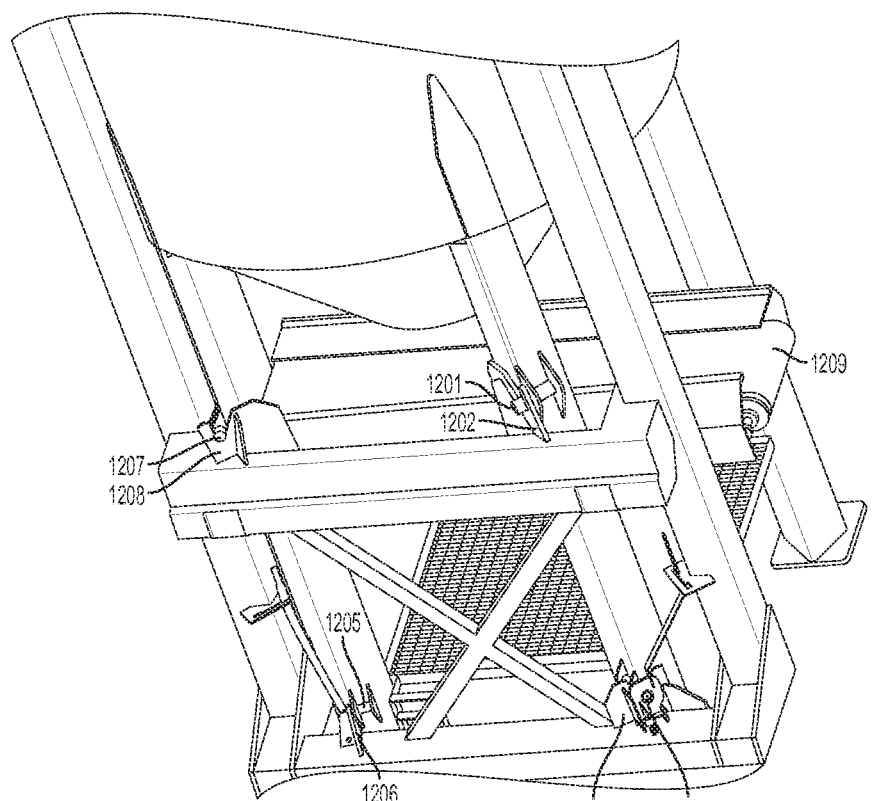

FIG. 12 depicts in an embodiment the orientation of hook plates and corresponding pins. Pins 1201, 1203, 1205 and 1207 are seated in hook plates 1202, 1204, 1206 and 1208, respectively. Hook plates 1202 and 1208 are laterally opposed to each other. Hook plates 1204 and 1206 are laterally opposed to each other. Also depicted is conveyor belt 1209.

Figure 13:
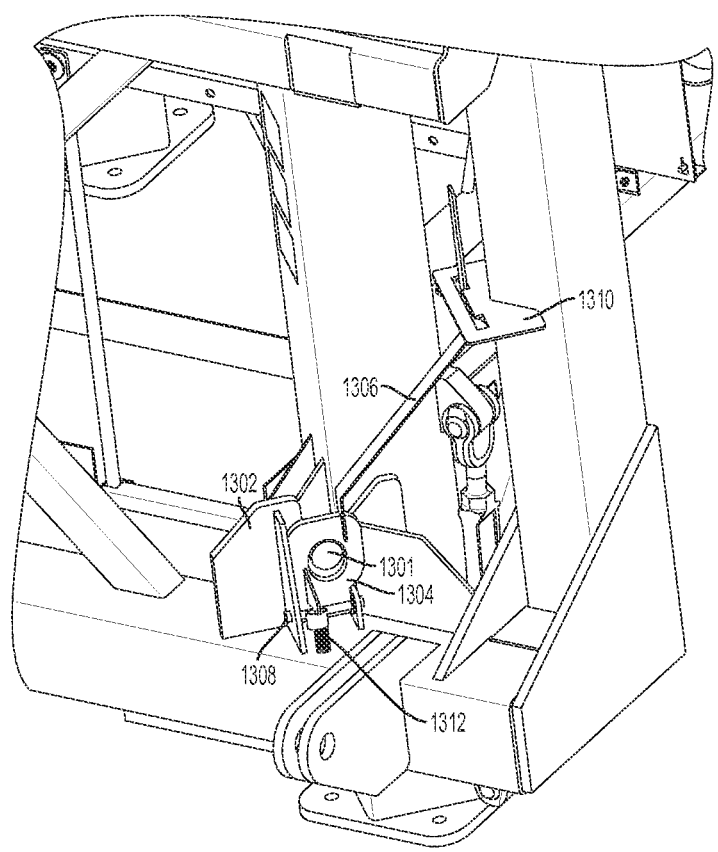

FIG. 13 depicts a latching mechanism engaged with a pin 1301 which is seated in hook plate 1302. Also depicted are hinged plate 1304 with a hole which is so located such that the hole in the plate may receive the end of pin 1301. In one embodiment, the latching mechanism comprises a spring 1312, a hinge 1308, a lever handle 1306 and a plate 1310 to secure the lever 1306.

Figure 14:
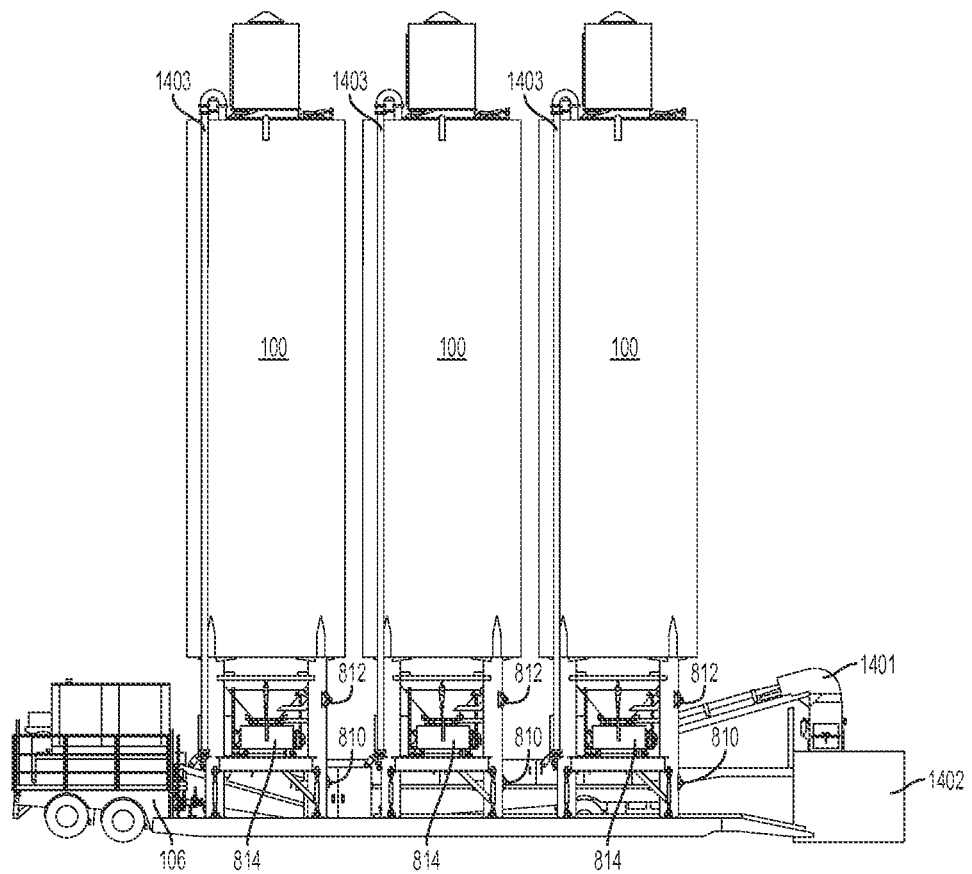

FIG. 14 depicts three silos 100 positioned side-by-side on a base platform 106. Also depicted are shuttle conveyors 814 which are located under the exit ports beneath each silo 100 such that the shuttle conveyor may be used to transfer material stored in silos 100 onto a dual belt conveyor 1401 or other receiving mechanism that delivers the material to a container, hopper or blender hopper 1402. The dual belt conveyor system 1401 is used, in certain preferred embodiments, to transport the material stored in the silos 100 into a container, storage bin, hopper or blender hopper 1402. Each of silos 100 may comprise one or more filler tubes 1403 that allows for filling of the silo with proppant or other material.

Figure 15:
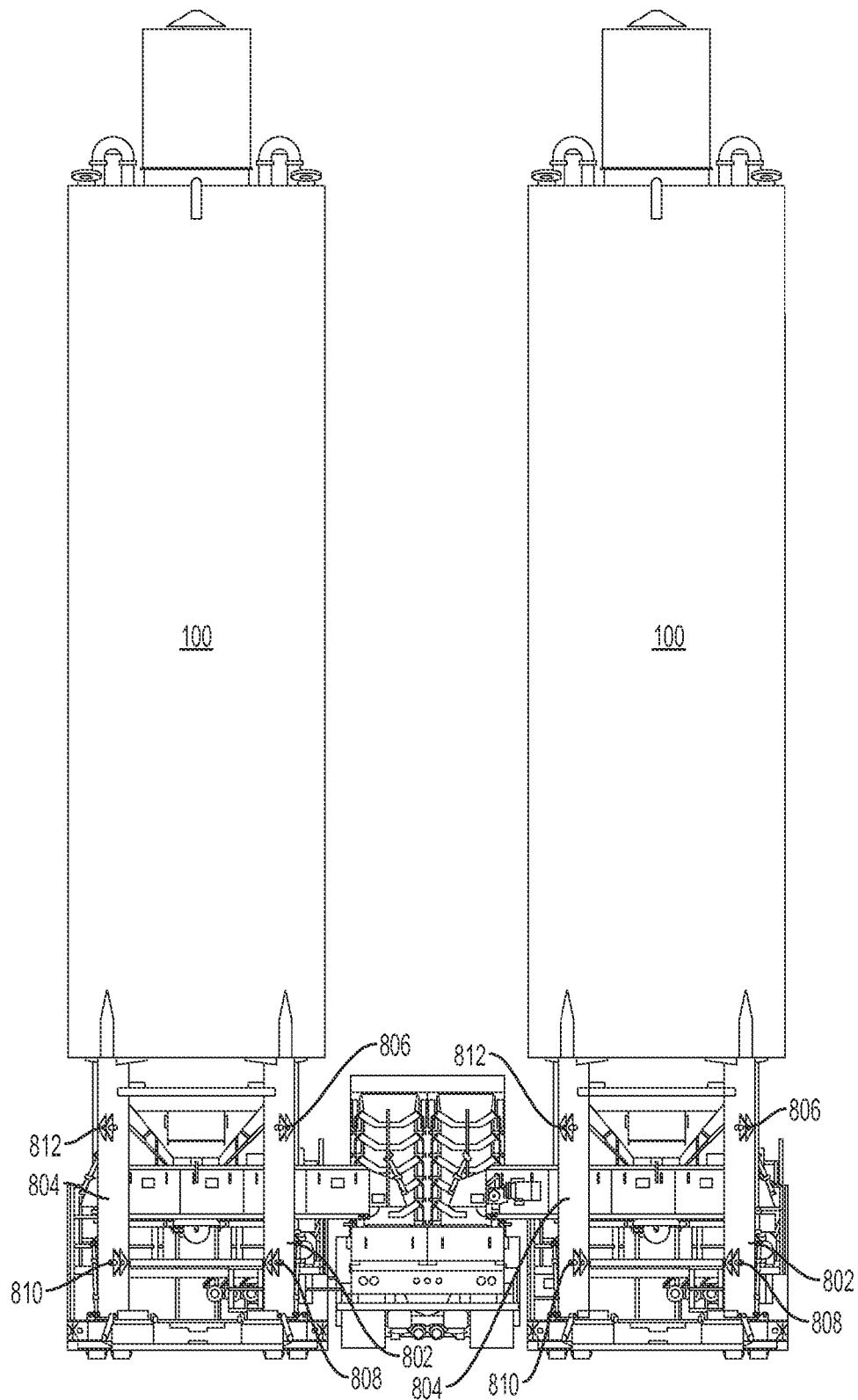

FIG. 15 depicts two silos 100 vertically positioned on two separate, neighboring base platforms. In between the two silos is a dual belt conveyor. The dual belt conveyor system is used, in certain preferred embodiments, to transport the material stored in the silos 100 into a blending or storage bin (not depicted).

Figure 16:
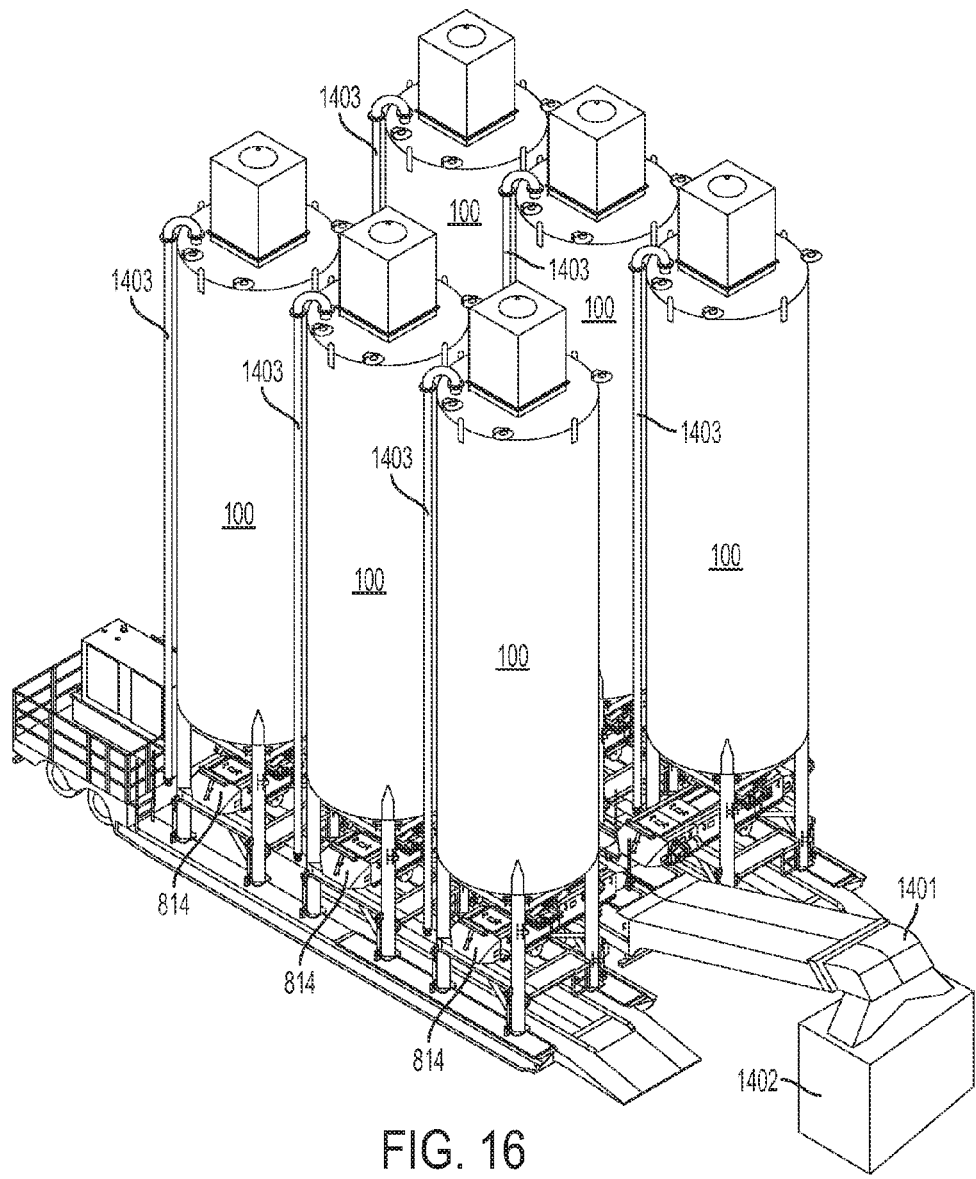

FIG. 16 depicts six silos 100 vertically positioned on two separate base platforms (in a "six pack" configuration). In between the two rows of three silos is a dual belt conveyor system 1401 that is fed by the shuttle conveyors 814 beneath each silo 100. The dual belt conveyor system 1401 as well as the shuttle conveyors 814 may be electronically controlled using a variable frequency drive that allows for variable speeds of the conveyors. The dual belt conveyor system 1401 is used, in certain preferred embodiments, to transport the material stored in the silos 100 into a container, storage bin, hopper or blender hopper 1402. Each of silos 100 may comprise one or more filler tubes 1403 that allows for filling of the silo with proppant or other material.

Deployment of Silo

To deploy a silo in one embodiment of the instant invention, a trailer 102, upon which is mounted a silo 100, is backed up onto the surface of a base platform 106 using a truck 104 that is coupled to a trailer 102. In a preferred embodiment, the tires of the trailer 102 are kept aligned and properly oriented via guiderails on the surface of the base platform 106. Optionally, tire stops may be employed to halt the movement of the trailer 102 at a desired position on the base platform 106.

Once the trailer 102 is in a desired position on the base platform 106, the rear end of the trailer (the end of the trailer 102 furthest away from the truck 104 in FIG. 1) is raised using hydraulic jacks that in an embodiment may be located and attached on either side of trailer 102. For example, in an embodiment hydraulic jack 108 of FIG. 1 and FIG. 9 and additionally a second hydraulic jack located at a corresponding location on the other side of trailer 102 from hydraulic jack 108 may be used to raise the rear end of the trailer about 8-10 inches depending on the ride height suspension of the trailer. In a preferred embodiment, hydraulic foot 110, and a second hydraulic foot located at a corresponding location on the other side of trailer 102 from hydraulic foot 110, are set to provide added structural support for the trailer 102 so it does not twist out of shape during raising or lowering of the silo 100. The purpose of the hydraulic jacks and hydraulic feet is two-fold: 1) they allow raising of the rear end of the trailer by an amount that provides room to swivel or rotate the silo around pivot point 208 so that the feet at the base of the silo can then be lowered down vertically to rest on the surface of base platform 106; and 2) they provide stability to the trailer 102 as the silo 100 is raised or lowered.

Once hydraulic jack 108 (and a second hydraulic jack located at a corresponding location on the other side of trailer 102 from hydraulic jack 108) and hydraulic foot 110 (and a second hydraulic foot located at a corresponding location on the other side of trailer 102 from hydraulic foot 110) are set and the back of trailer 102 is elevated, the actuator 202 is engaged to push the rocker arm 204 up and raise the silo. The actuators described herein may be powered, for example by hydraulic jacks or pneumatic jacks. The size of the rocker arm 204 is optimized based on the load size of the silo and the strength of the actuator 202, as would be apparent to one of ordinary skill in the art based on the disclosure of this specification. In one embodiment, the shape of rocker arm 204 and the position of pin 214 at the vertex of an angle was optimized over multiple iterations to account for at least three factors: 1) allowing for the silo 100 to lie as flat as possible in the travel position when mounted onto the trailer 102; 2) allowing a shorter moment arm in rocker arm 204 so that a sufficient force is applied through arm 206 to cause the flipper 210 to rotate, raising the silo when actuator 202 is activated. In preferred embodiments, the silo 100 is not directly attached to arm 206. The vertical component comes from the rotation of the flipper 210; and 3) the force required from the actuator 202 to lift the silo to an erect configuration. The pins 212 and 214 that go through the rocker arm are in one embodiment parallel to each other.

Since the front end of the trailer 102 (the end of the trailer that is closest to the truck 104 in FIG. 2) is lower than the back of the trailer due to the hydraulic jacks 208 and hydraulic feet 212, it is necessary to rotate the silo 100 greater than 90 degrees around the pivot point at 208 when the silo is to be deployed. In a preferred embodiment, the center of gravity of the silo 100, when empty, is about two thirds the height of the silo measured from the bottom of the silo. While the silo is being lifted, once the center of gravity of the silo 100 crosses above the line formed by pivot point 208 and the corresponding pivot point (connecting the corresponding rocker arm to the trailer) on the other side of the trailer, the torque caused by the action of gravity upon silo 100 will, if not countered, cause silo 100 to fall in the opposite direction, i.e., away from and behind trailer 102. This point at which this torque is zero (i.e., the point at which the center of gravity of the silo 100 crosses above the line formed by pivot point 208 and the corresponding pivot point on the other side of the trailer) is referred to as the "break point." Once the silo 100 passes the "break point," a counter balance mechanism that is a component of the actuator 202 prevents the silo from actually falling by counteracting the torque due to gravity. The counter balance mechanism is a hydraulic control device called a counter balance valve. In a preferred embodiment, counterbalance valves are a regulating mechanism on valve-powered cylinders, such as those on electrical repair trucks. The counterbalance valves serve to limit the amount of fluid change within the flange, thus preventing sudden changes in pressure and resultant instability valves work by reacting to the weight of the load as that weight is translated into pressure on the pump cylinder. For example, in a repair truck, the weight of the platform (and any repairmen within) supply the downward pressure to the cylinder. When the counterbalance valves are directly triggered by the force of the weight, which occurs when the load is being lowered or if the cylinder malfunctions, the valve restricts the amount of air or fluid that it releases. As a result of the counterbalance valve's releasing fluid gradually, the load is stabilized and prevented from falling in a completely uncontrolled manner. Counterbalance valves are used as a safety mechanism, and to keep pressure cylinders stable as they contract to lower a load or release pressure.

In a preferred embodiment, the configuration of the trailer 102 during silo deployment is such that the rear end of the trailer is elevated compared to the front of the trailer. In this configuration, when the silo 100 is vertical, the break point will have been passed. In one embodiment, while the silo 100 is being raised to the vertical position, or being lowered from the vertical position, the latching mechanism depicted in FIG. 4B or 13 (or in alternative embodiments, pneumatic locking pin 1116 (and a similar pneumatic locking pin located on the other side of the flipper mechanism 1114)) are engaged to keep silo 100 firmly secured to flipper mechanism 1114.

In a preferred embodiment, the latching mechanism incorporates a hinged plate 1304 with a hole in it as depicted in FIGS. 4B and 13. The hinge 1308 is coupled to the flipper mechanism and is so located that the hole in hinged plate 1304 may receive the end of the pin 808, so that the pin cannot be disengaged from the hook plates. A corresponding hinged plate that is not depicted in FIG. 13 is oriented such that it may receive the end of pin 810. In one embodiment, this design requires activation of the latching mechanism via a manually operated lever as depicted in FIGS. 4B and 13. In another embodiment, the manually operated lever may be replaced with an automatic device involving a linkage and/or a cam, using the rotation of the flipper mechanism 210 or 712 relative to the trailer 102 to engage and disengage the latch. Thus, the latching mechanism depicted in FIGS. 4B and 13 is engaged to keep the silo secured to the flipper mechanism 210 or 712. Other latching mechanisms could be used, such as pneumatic latching mechanisms 1116 (and a corresponding latching pneumatic latching mechanism not depicted in FIG. 11). When the silo is vertical, the weight of the silo keeps the four pins, 806, 808, 810, and 812 engaged with the corresponding hook plates attached to or part of the flipper mechanism. As the silo rotates to horizontal, however, the effect of the weight of the silo keeping the pins engaged in the corresponding hook plates is lost. Therefore, the latching mechanism keeps the silo 100 firmly secured to the flipper mechanism 210 or 712 during raising and lowering of the silo.

In one embodiment, when the silo 100 is vertical, the latching mechanism depicted in FIGS. 4B and 13 is disengaged to facilitate lowering of the silo 100 onto the surface of the base platform 106. Prior to lowering the silo 100, all of the weight of the silo is on the four pins 806, 808, 810 and 812, which are engaged with the corresponding hook plates attached to or part of the flipper mechanism. At this time, it is safe to retract the manual or hydraulic foot 110 (and the corresponding hydraulic foot located on the other side of trailer 102). Next, the rear end of the trailer 102 is lowered by disengaging the hydraulic jack 108 and the second hydraulic jack correspondingly located on the other side of the trailer. Disengaging these hydraulic jacks lowers the trailer 102 down so that the tires on trailer 102 rest on the surface of the base platform 106. This causes the silo 100 to also be lowered onto the surface of base platform 106 such that the hook plates attached to or part of the flipper mechanism disengage from the corresponding pins attached to the silo legs. At this point the silo is in a free-standing and vertical configuration on the base platform.

In a preferred embodiment, the four feet at the base of the silo 100 are secured to the base platform 106 using turnbuckles to prevent the silo from toppling in high-wind conditions. The manner in which such turnbuckles may be configured, used and attached to base platform 106 and the four feet of silo 100 would be apparent to one of ordinary skill in the art based on the disclosure in this specification.

The flipper mechanism 210 may be lowered back to a horizontal position on the trailer 102 by retracting the actuator arms.

In a preferred embodiment, the silo 100 comprises one or more tubes attached to and running up the side of the silo 100 which allows for sand, proppant or water to be added to the silo. Vents at the top or sides of the silo 100 prevent the accumulation of excessive pressure inside the silo 100. Optionally, since material to be added to the silo may include dust, a dust collector or a dust suppressor may be appropriately positioned on or near such vents to prevent dust from being released into the environment. For example, the dust collector may be self-cleaning such that dust is recycled back into the silo and not liberated into the environment to be used as needed.

Retracting the Silo

In one embodiment of the invention, the trailer 102 is backed onto the base platform 106 such that the tires are directed in a linear path using guiderails attached to the surface of the base platform 106. In a preferred embodiment, the trailer stops at a determined position using tire stops positioned on the base platform 106.

Once the trailer 102 is in the desired position, the flipper mechanism 210 is raised to a vertical orientation using the actuators such that the hook plates attached to or part of the flipper mechanism are aligned for engagement of the corresponding pins attached to the legs of the silo. The vertical orientation of the flipper mechanism 710 may exceed 90 degrees due to the orientation of the trailer. Prior to elevating the rear end of the trailer 102 using hydraulic jack 108 and a second hydraulic jack located in a corresponding position on the other side of trailer 102, the hook plates 702, 704, 706 and 708 attached to or part of the flipper mechanism 710 will be lower than the pins 806, 808, 810 and 812 that are attached to the legs of the silo 802 and 804, because the rear end of the trailer 102 has not been elevated yet. Once the flipper mechanism 710 is in position, the trailer 102 is then raised using the hydraulic jack 108 and the second hydraulic jack located in a corresponding position on the other side of trailer 102 (which are independent of each other so that the trailer can be leveled) so that the four hook plates 702, 704, 706 and 708 engage the four pins 806, 808, 810 and 812 attached to silo legs 802 and 804 and the pins are thereby seated into the bottom portions of each corresponding hook plate. The orientation of the pins and hook plates as described above assists in easily and smoothly accomplishing this engagement. The hydraulic jack 108 and the corresponding hydraulic jack on the other side of trailer 102 are used to raise the silo off the surface of the base platform 106. The foot 110 and the corresponding foot on the other side of trailer 102, which in a preferred embodiment are hydraulic, are set to provide added structural stability and support. The latch mechanism 406, or in an alternative embodiment, pneumatic pins, are reactivated to engage the corresponding holes in the silo legs.

Actuators 1210 and 1212 are activated to bring the silo down from a vertical position to a horizontal position resting on trailer 102.

In a preferred embodiment, actuators 1210 and 1212 are hydraulic cylinder rods (coupled to the rocker arms 1204 and 1202) that are oversized so that rod head surface area on the side to which the rod is attached is less than the surface area of the rod head on the opposite side. This prevents the operator from retracting the silo 100 if it has material in it and has added weight.

The silo 100 is now fully in the "traveling position." Foot 110 and the corresponding foot on the other side of trailer 102 are now retracted and the silo 100 is fastened or shackled to the trailer 102 using turnbuckles or other load binding device.

Hydraulic jack 108 and the corresponding jack on the other side of trailer 102 are now lowered such that the tires of trailer 102 are fully in contact with the base platform 106. The operator is free to drive straight off the base platform 106.

Self-Aligning Hook Plates and Pins

In one aspect of the invention, the inventors have developed a unique and highly advantageous system of hook plates and pins that allow the flipper mechanism to rotate the silo in embodiments of the invention from a horizontal position resting on the trailer to a fully vertical position resting on the base platform, and vice versa. The unique orientation of the hook plates with respect to the corresponding pins allows for the hook plates and pins to "self align" as they are being engaged by the operator.

As depicted in FIG. 8, the pins are attached to the legs of the silo such that they form angles with respect to each other. For example, the pins 806 and 808 are attached to silo leg 802. The orientation of the pins is such that they are attached to different faces of the silo leg 802 and form an angle of approximately 90 degrees with respect to one another. Similarly, the corresponding hook plates attached to or part of the flipper mechanism form corresponding angles with respect to each other such that they are oriented in a manner that allows for the hook plates to engage with the corresponding pins. The pins attached to silo leg 804 are similarly oriented with respect to each other. In the embodiment depicted in FIG. 8, pins 806 and 810 are substantially parallel to one another, and pins 808 and 812 are substantially parallel to one another. The orientation of the four pins and the four hook plates allows the hook plates and pins to "self align" when the flipper mechanism is used to engage the silo for retraction. The unique alignment of the system of hook plates and pins also provides the beneficial advantage of minimizing any movement of the silo once it is coupled to the flipper mechanism. Once the hook plates and pins are engaged, the silo is essentially locked into place and not free to slip off the flipper mechanism or be subject to any lateral movement.

The present invention has been described in terms of several embodiments solely for the purpose of illustration. Persons skilled in the art will recognize from this description that the invention is not limited to the embodiments described, and may be practiced with modifications and alterations limited only by the spirit and scope of the appended claims which are intended to cover such modifications and alterations, so as to afford broad protection to the invention and its equivalents.

What is claimed is:

1. A storage system comprising:
   a) a trailer, the trailer including:
      (1) a trailer bed;
      (2) a flipper mechanism coupled to said trailer bed;
      (3) a rocker arm coupled to said trailer bed and said flipper mechanism;
      (4) a first hook plate and a second hook plate attached to said flipper mechanism, wherein said first hook plate and said second hook plate are laterally opposed to each other on said flipper mechanism and wherein said first hook plate and said second hook plate are oriented at a first non-zero angle with respect to each other;
   b) a storage bin, the storage bin including:
      (1) a plurality of support legs;
      (2) a first pin and a second pin attached to said plurality of support legs, said first pin coupleable to said first hook plate and said second pin coupleable to said second hook plate.

2. The storage system of claim 1 further comprising:
   a) a third hook plate and a fourth hook plate attached to said flipper mechanism, wherein said third hook plate and said fourth hook plate are laterally opposed to each other on said flipper mechanism and wherein said third hook plate and said fourth hook plate are oriented at a second non-zero angle with respect to each other; and
   b) a third pin and a fourth pin attached to said plurality of support legs, said third pin coupleable to said third hook plate and said fourth pin coupleable to said fourth hook plate.

3. The storage system of claim 2, wherein said first non-zero angle and said second non-zero angle are equal to each other.

4. The storage system of claim 1, wherein said first pin and said second pin are oriented at a third non-zero angle with respect to each other.

5. The storage system of claim 2, wherein said third pin and said fourth pin are oriented at a fourth non-zero angle with respect to each other.

6. The storage system of claim, 1 wherein said first pin and said second pin are oriented at approximately 90 degrees with respect to one another.

7. The storage system of claim 2, wherein said third pin and said fourth pin are oriented at approximately 90 degrees with respect to one another.

8. The storage system of claim 1, wherein said first pin and said second pin are oriented at a third non-zero angle with respect to each other, said third pin and said fourth pin are oriented at a fourth non-zero angle with respect to each other; wherein said third non-zero angle and said fourth non-zero angle are equal to each other.

9. The storage system of claim 1, wherein said storage system further comprises a base platform.

10. The storage system of claim 9, wherein said base platform comprises tire guide rails.

11. The storage system of claim 9, wherein said base platform is configured to support three of said storage bins in a vertical position.

12. The storage system of claim 9, wherein said base platform is configured to support two of said storage bins in a vertical position.

13. The storage system of claim 9, wherein said base platform is configured to support one of said storage bins in a vertical position.

14. The storage system of claim 1, wherein said trailer comprises independently operable hydraulic support legs.

15. The storage system claim 1, wherein said trailer comprises non-hydraulic support legs.

16. The storage system of claim 15, wherein in said non-hydraulic support legs are positioned at a middle section of said trailer.

17. The storage system of claim 1, wherein said flipper mechanism is rotatably coupled to said trailer.

18. The storage system of claim 17, wherein said flipper mechanism is coupled to the rear end of said trailer.

19. The storage system of claim 1, wherein said flipper mechanism further comprises one or more pneumatic locking pins coupleable to said storage bin.

20. The storage system of claim 1, wherein said flipper mechanism further comprises one or more pneumatic locking pins coupleable to said support legs.

21. The method of claim 1, wherein said rocker arm is coupled to said flipper mechanism via a second arm.

22. The storage system of claim 1, wherein said rocker arm is coupled to an actuator.

23. The storage system of claim 22, wherein said actuator is a hydraulic cylinder or a hydraulic piston.

24. The storage system of claim 22, wherein said rocker arm is curvilinear such that it forms a non-zero angle.

25. The storage system of claim 24, wherein lines drawn from each end of the rocker arm down a center axis of the rocker arm intersect with each other at a middle section of said rocker arm.

26. The storage system of claim 24, wherein said non-zero angle is greater than 90 degrees.

27. The storage system of claim 22, wherein said actuator is coupled to a middle section of said rocker arm.

28. The storage system of claim 1, wherein said first and second hook plates do not comprise a latching mechanism.

29. The storage system of claim 2, wherein said third and fourth hook plates do not comprise a latching mechanism.

30. The storage system of claim 1, wherein said first and second hook plates comprise a latching mechanism.

31. The storage system of claim 2, wherein said third and fourth hook plates comprise a latching mechanism.

32. The storage system of claim 1, wherein said first and second hook plates are oriented at approximately 90 degrees with respect to each other.

33. The storage system of claim 1, wherein said first and third hook plates comprise a first pair of hook plates and are oriented such that they are approximately parallel to each other.

34. The storage system of claim 1, wherein said second and fourth hook plates comprise a second pair of hook plates and are oriented such that they are approximately parallel to each other.

35. The storage system of claim 1 wherein said first and third hook plates comprise a first pair of hook plates and are oriented such that they are approximately parallel to each other, said second and fourth hook plates comprise a second pair of hook plates and are oriented such that they are approximately parallel to each other;
   wherein said first pair of hook plates and said second pair of hook plates are oriented at a non-zero angle with respect to each other.

36. The storage system of claim 35, wherein said non-zero angle is approximately 90 degrees.

37. The storage system of claim 2, wherein said third and fourth hook plates are oriented at approximately 90 degrees with respect to each other.

38. The storage system of claim 1, wherein said storage bin is cylindrical.

39. The storage system of claim 1, wherein said storage bin is a silo.

40. The storage system of claim 1, wherein said storage bin further comprises a dust suppression mechanism.

41. The storage system of claim 1, wherein said storage bin comprises a regulatable exit port.

42. The storage system of claim 1, wherein said storage bin further comprises a conveyor assembly located below an exit port in said storage bin.

43. The storage system of claim 1, wherein said storage bin comprises an entry port located at the top of said storage bin.

44. The storage system of claim 40, wherein said dust suppression mechanism is located proximal to an entry port on said storage bin.

45. The storage system of claim 1, wherein said storage bin contains a proppant.

46. The storage system of claim 45, wherein said proppant comprises a solid particulate material.

47. The storage system of claim 46, wherein said particulate material comprises one or more materials selected from the group consisting of sand, silica sand, resin-coated sand and ceramic.

48. The storage system of claim 1, wherein said storage bin contains a liquid or a gas or both a liquid and a gas.

49. The storage system of claim 48, wherein said liquid comprises water.

50. The storage system of claim 48, wherein said liquid further comprises an organic additive.

51. The storage system of claim 50, wherein said organic additive is selected from the group consisting of a biocide, a surfactant, a viscosity adjuster, an anti-foaming agent and an emulsifier.

52. The storage system of claim 48, wherein said gas is pressurized or compressed.

53. The storage system of claim 52, wherein said gas comprises air, carbon dioxide or nitrogen.

54. The storage system of claim 1, wherein one planar surface of at least two support legs is tangentially oriented with respect to said storage bin.

55. The storage system of claim 1, wherein said storage system comprises a remotely operated control system.

56. A method of raising a storage bin to a vertical position comprising:
   a) positioning a trailer onto the surface of a base platform;
   b) activating independent hydraulic jacks to elevate the rear end of said trailer;
   c) wherein said trailer includes:
      (1) a flipper mechanism coupled to said trailer;
      (2) a rocker arm coupled to said trailer and said flipper mechanism;
      (3) a first hook plate and a second hook plate attached to said flipper mechanism, wherein said first hook plate and said second hook plate are laterally opposed to each other on said flipper mechanism and oriented at a non-zero angle with respect to each other;
   d) wherein said first hook plate and said second hook plate are coupled to pins attached to support legs on said storage bin;
   e) activating an actuator coupled to said rocker arm to raise said storage bin to a vertical position;
   f) releasing said hydraulic jacks to lower said rear end of said trailer to thereby disengage said storage bin from said hook plates and vertically position said storage bin on the surface of said base platform.

57. The method of claim 56 further comprising:
   a) a third hook plate and a fourth hook plate attached to said flipper mechanism, wherein said third hook plate and said fourth hook plate are laterally opposed to each other on said flipper mechanism and wherein said third hook plate and said fourth hook plate are oriented at a second non-zero angle with respect to each other; and
   b) a third pin and a fourth pin attached to said plurality of support legs, said third pin coupleable to said third hook plate and said fourth pin coupleable to said fourth hook plate.

58. The method of claim 57, wherein said first non-zero angle and said second non-zero angle are equal to each other.

59. The method of claim 56, wherein said first pin and said second pin are oriented at a third non-zero angle with respect to each other.

60. The method of claim 57, wherein said third pin and said fourth pin are oriented at a fourth non-zero angle with respect to each other.

61. The method of claim, 56 wherein said first pin and said second pin are oriented at approximately 90 degrees with respect to one another.

62. The method of claim 57, wherein said third pin and said fourth pin are oriented at approximately 90 degrees with respect to one another.

63. The method of claim 57, wherein said third pin and said fourth pin are oriented at a non-zero angle with respect to each other, said first pin and said second pin are oriented at approximately 90 degrees with respect to one another.

64. The method of claim 56, wherein said storage system further comprises a base platform.

65. A method of lowering a storage bin to a horizontal position on a trailer comprising:
   a) positioning a trailer onto the surface of a base platform;
   b) activating independent hydraulic jacks to elevate the rear end of said trailer to engage pins attached to support legs of the storage bin;
   c) wherein said trailer includes:
      1) a flipper mechanism coupled to said trailer;
      2) a rocker arm coupled to said trailer and said flipper mechanism;
      3) a first hook plate and a second hook plate attached to said flipper mechanism, wherein said first and second hook plate are laterally opposed to each other on said flipper mechanism and oriented at a non-zero angle with respect to each other, said first and second hook plates are coupled to first and second pins attached to support legs on said storage bin;
   d) activating an actuator coupled to said rocker arm to lower said storage bin to a horizontal position;
   e) releasing said hydraulic jacks to lower said rear end of said trailer.

66. The method of claim 65 further comprising:
   a) a third hook plate and a fourth hook plate attached to said flipper mechanism, wherein said third hook plate and said fourth hook plate are laterally opposed to each other on said flipper mechanism and wherein said third hook plate and said fourth hook plate are oriented at a second non-zero angle with respect to each other; and
   b) a third pin and a fourth pin attached to said plurality of support legs, said third pin coupleable to said third hook plate and said fourth pin coupleable to said fourth hook plate.

67. The method of claim 66, wherein said first non-zero angle and said second non-zero angle are equal to each other.

68. The method of claim 65, wherein said first pin and said second pin are oriented at a third non-zero angle with respect to each other.

69. The method of claim 66, wherein said third pin and said fourth pin are oriented at a fourth non-zero angle with respect to each other.

70. The method of claim, 65 wherein said first pin and said second pin are oriented at approximately 90 degrees with respect to one another.

71. The method of claim 66, wherein said third pin and said fourth pin are oriented at approximately 90 degrees with respect to one another.

72. The method of claim 66, wherein said first pin and said second pin are oriented at a third non-zero angle with respect to each other, said third pin and said fourth pin are oriented at a fourth non-zero angle with respect to each other;

wherein said third non-zero angle and said fourth non-zero angle are equal to each other.

73. The method of claim 65, wherein said method further comprises a base platform.

74. A trailer comprising:
a) a trailer bed;
b) a flipper mechanism rotatably coupled to said trailer bed;
c) a rocker arm coupled to said trailer bed and said flipper mechanism;
d) a first hook plate and a second hook plate attached to said flipper mechanism, wherein said first hook plate and said second hook plate are laterally opposed to each other on said flipper mechanism and wherein said first hook plate and said second hook plate are oriented at a first non-zero angle with respect to each other;
e) an actuator coupled to said rocker arm.

75. The trailer of claim 74 wherein said first hook plate and said second hook plate are respectively coupleable to a first pin and a second pin of a storage bin, wherein the first pin and the second pin are oriented at a non-zero angle with respect to each other.

* * * * *